United States Patent
Miller et al.

(10) Patent No.: US 7,166,146 B2
(45) Date of Patent: Jan. 23, 2007

(54) MIXED MATRIX MEMBRANES WITH SMALL PORE MOLECULAR SIEVES AND METHODS FOR MAKING AND USING THE MEMBRANES

(75) Inventors: Stephen J. Miller, San Francisco, CA (US); Alexander Kuperman, Orinda, CA (US); De Q. Vu, San Pablo, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 82 days.

(21) Appl. No.: 10/745,992

(22) Filed: Dec. 24, 2003

(65) Prior Publication Data

US 2005/0139066 A1 Jun. 30, 2005

(51) Int. Cl.
*B01D 53/22* (2006.01)

(52) U.S. Cl. ............... 95/45; 95/47; 95/51; 96/4; 96/8; 96/10; 96/12; 96/13; 96/14; 96/135; 96/153; 55/DIG. 5

(58) Field of Classification Search .......... 95/45, 95/47, 51; 96/4, 8, 10, 12–14, 135, 153; 55/DIG. 5

See application file for complete search history.

(56) References Cited

U.S. PATENT DOCUMENTS

| | | |
|---|---|---|
| 3,567,632 A | 3/1971 | Richter et al. |
| 4,230,463 A | 10/1980 | Henis et al. |
| 4,310,440 A | 1/1982 | Wilson et al. |
| 4,440,871 A | 4/1984 | Lok et al. |
| 4,503,023 A | 3/1985 | Breck et al. |
| 4,544,538 A | 10/1985 | Zones |
| 4,567,029 A | 1/1986 | Wilson et al. |
| 4,661,332 A | 4/1987 | Vaughan |
| 4,698,217 A | 10/1987 | Valyocsik |
| 4,740,219 A * | 4/1988 | Kulprathipanja et al. ...... 95/51 |
| 4,778,780 A | 10/1988 | Valyocsik et al. |
| 4,851,204 A | 7/1989 | Wilson et al. |
| 4,925,459 A | 5/1990 | Rojey et al. |
| 4,973,785 A | 11/1990 | Lok et al. |
| 5,104,425 A * | 4/1992 | Rao et al. ...................... 95/47 |
| 5,104,532 A | 4/1992 | Thompson |
| 5,127,925 A | 7/1992 | Kulprathipanja et al. |
| 5,234,471 A | 8/1993 | Weinberg |

(Continued)

OTHER PUBLICATIONS

Koros, W.J. and Mahajan, R., Pushing the Limits on Possibilities for Large Scale Gas Separation: Which Strategies? *Journal of Membrane Science*, 175, 181--196, 2000.

(Continued)

*Primary Examiner*—Jason M. Greene
(74) *Attorney, Agent, or Firm*—Richard J. Schulte; Frank C. Turner

(57) ABSTRACT

A mixed matrix membrane is provided which comprises a continuous phase organic polymer and small pore molecular sieves dispersed therein. The molecular sieves have a largest minor crystallographic free diameter of 3.6 Angstroms or less. When these molecular sieves are properly interspersed with a continuous phase polymer, the membrane will exhibit a mixed matrix membrane effect, i.e., a selectivity increase of at least 10% relative to a neat membrane containing no molecular sieves. Finally, methods for making and using such mixed matrix membranes to separate gases from a mixture containing two or more gases are also disclosed.

38 Claims, 1 Drawing Sheet

Schematic of gas permeation apparatus for flat membrane films

U.S. PATENT DOCUMENTS

| | | |
|---|---|---|
| 5,370,851 A | 12/1994 | Wilson |
| 6,340,433 B1* | 1/2002 | Kuznicki et al. ............ 210/651 |
| 6,395,067 B1* | 5/2002 | Kuznicki et al. .............. 95/47 |
| 6,488,741 B2* | 12/2002 | Olson ........................... 95/144 |
| 6,500,233 B1* | 12/2002 | Miller et al. .................... 95/50 |
| 6,503,295 B1* | 1/2003 | Koros et al. .................... 95/51 |
| 6,508,860 B1* | 1/2003 | Kulkarni et al. ................ 95/51 |
| 6,605,140 B2* | 8/2003 | Guiver et al. ..................... 96/4 |
| 6,626,980 B2* | 9/2003 | Hasse et al. .................... 95/51 |
| 6,663,805 B1* | 12/2003 | Ekiner et al. .............. 264/45.9 |
| 2002/0053284 A1* | 5/2002 | Koros et al. .................... 95/51 |
| 2002/0056369 A1* | 5/2002 | Koros et al. .................... 95/51 |
| 2003/0089227 A1* | 5/2003 | Hasse et al. .................... 95/45 |
| 2003/0089228 A1* | 5/2003 | Kulprathipanja et al. ...... 95/45 |
| 2003/0131731 A1* | 7/2003 | Koros et al. .................... 96/10 |
| 2003/0140789 A1* | 7/2003 | Koros et al. .................... 96/10 |
| 2004/0173094 A1* | 9/2004 | Nakayama et al. ............ 95/45 |
| 2005/0139065 A1* | 6/2005 | Miller et al. .................... 95/45 |

OTHER PUBLICATIONS

Kulprathipanja, S., Mixed Matrix Membrane Development, *Membrane Technology*, No. 144, 9-12, no date.

* cited by examiner

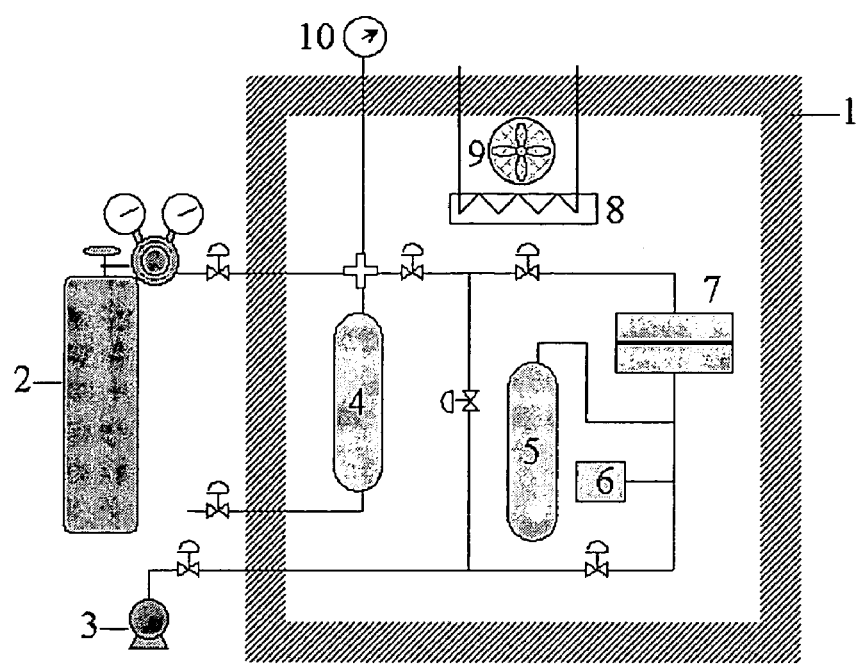
FIG. 1 Schematic of gas permeation apparatus for flat membrane films

MIXED MATRIX MEMBRANES WITH SMALL PORE MOLECULAR SIEVES AND METHODS FOR MAKING AND USING THE MEMBRANES

TECHNICAL FIELD

This invention relates generally to gas separation membranes and to methods of making and using the same, and more particularly, to mixed matrix membranes which use molecular sieves to enhance gas separation properties of the membranes.

BACKGROUND OF THE INVENTION

Numerous references teach using mixed matrix membranes which comprise a continuous polymer phase carrier with molecular sieves dispersed therein. Examples include U.S. Pat. No. 4,925,459 to Rojey et al. and U.S. Pat. No. 5,127,925 to Kulprathipanja et al. The membranes are particularly useful for separating gases from a mixture or feedstock containing at least two gas components, generally of differing effective diameters. Under the proper conditions, the molecular sieves may increase the relative effective permeability of a desirable gas component through the polymeric membrane (and/or decrease effective permeability of the other gas components), and thereby enhance the gas separation (selectivity) of the polymeric membrane material. If a mixed matrix membrane has a higher selectivity than a similar membrane without the molecular sieves, then the mixed matrix membrane is referred to as exhibiting a "mixed matrix" effect.

Membrane performance is characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity can be defined as the ratio of the permeabilities of the gas components across the membrane (i.e., $P_A/P_B$, where A and B are the two components). A membrane's permeability and selectivity are material properties of the membrane material itself, and thus these properties are ideally constant with feed pressure, flow rate and other process conditions. However, permeability and selectivity are both temperature-dependent. It is desirable for membrane materials to have a high selectivity (efficiency) for the desired component, while maintaining a high permeability (productivity) for the desired component.

U.S. Pat. No. 6,626,980 to Hasse et al., entitled "Mixed Matrix Membranes Incorporating Chabazite Type Molecular Sieves", suggests that pore dimensions of molecular sieves are critical to the performance of membranes. The pore size determines whether molecules of a certain size can enter and exit the framework of a molecular sieve. Hasse et. al provide that, in practice, it has been observed that very slight decreases in ring dimensions defining such framework can effectively hinder or block movement of a particular gas component through a molecular sieve. Hasse et al. teach using a zeolite molecular sieve, SSZ-13, having a chabazite type structure for gas separation.

This chabazite type structure has pores based on 8 member rings with about 3.8×3.8 Angstrom dimensions. The synthesis of this particular SSZ-13 molecular sieve is disclosed in U.S. Pat. No. 4,544,538.

There is a need for additional choices of molecular sieves which have pores or pores therein which are sufficiently large so that permeability is satisfactory. If rates of permeation are insufficient, a membrane may not be economically viable for use in gas separation. Contrarily, if the selectivity of a membrane is not satisfactory, then the membrane again may not be economically viable as too much of a non-desirable gas component may also permeate through the membrane. The present invention provides mixed matrix membranes which utilize molecular sieves having structures, compositions and other characteristics which provide superior separation performance as compared to conventional membranes. Furthermore, methods of making and utilizing these membranes for gas separation are also taught.

SUMMARY OF THE INVENTION

A mixed matrix membrane is provided which comprises a continuous phase organic polymer with small pore alumina containing molecular sieves dispersed therein. The molecular sieves ideally have a largest minor crystallographic free diameter of 3.6 Angstroms or less.

When these molecular sieves are properly interspersed with a continuous phase polymer, the membrane ideally will exhibit a mixed matrix effect. The largest minor crystallographic free diameter of pores of these molecular sieves may be as small as 3.6 Å, 3.4 Å, or even as small as 3.0 Å or less. In some instances, it is advantageous to have pores which are generally elliptical or oblong in cross-section rather than circular. Exemplary molecular sieves may include, but are not limited to, the following IZA (International Zeolite Association) structure types: ERI, DDR, RHO, PAU, LEV, MER, AFX, AFT, and GIS. Examples of preferred molecular sieves include: AlPO-17, SAPO-17, MeAPSO-17, CVX-7, ZSM-58, LZ-214, ECR-18, SAPO-35, Zeolite W, SAPO-56, AlPO-52, and SAPO-43. The more preferable molecular sieves are CVX-7, SAPO-17 and MeAPSO-17 with CVX-7 being the most preferred molecular sieve.

In other aspects of this invention, a method for making a mixed matrix membrane with molecular sieves with small pores is also taught. Finally, methods for using such mixed matrix membranes to separate gases from a mixture containing two or more gas components will also be described. Gases that differ in size, for example nitrogen and oxygen or ethylene and ethane, can be separated using the membranes described herein. In one preferred embodiment, a gaseous mixture containing methane and carbon dioxide can be enriched in methane by a gas-phase process through the mixed matrix membrane. In other cases, by way of example and not limitation, the membranes can be used to separate helium, hydrogen, hydrogen sulfide, oxygen and/or nitrogen from gas mixtures.

It is an object of the present invention to provide mixed matrix membranes which utilize small pore molecular sieves having a largest minor crystallographic free diameter of 3.6 Å or less.

Another object is to provide mixed matrix membranes which have molecular sieves which are small in particle size and aspect ratio.

BRIEF DESCRIPTION OF THE DRAWINGS

FIG. 1 is a schematic drawing of a separation system used to test the permeability and selectivity of a particular membrane.

BEST MODE(S) FOR CARRYING OUT THE INVENTION

Mixed matrix membranes, made in accordance with the present invention, include small pore molecular sieves dispersed into a continuous phase polymer.

Ideally, the molecular sieves of the present invention have pores with a largest minor crystallographic free diameter of less than 3.6 Angstroms, and more preferably, between 3.0–3.6 Å. Descriptions of crystallographic free diameters of pores of molecular sieves are published, for example, in "Atlas of Zeolite Framework Types," edited by C. Baerlocher et al., Fifth Revised Edition (2001). This reference is hereby incorporated by reference in its entirety, particularly for its teachings regarding the crystallographic free diameters of zeolites and other like non-zeolitic molecular sieves.

Continuous phase polymers which can support the molecular sieves will first be described. Then, exemplary molecular sieves to be incorporated into the continuous phase polymer will be taught. A method of making mixed matrix membranes utilizing the polymers and molecular sieves will next be described. Finally, examples will show that mixed matrix membranes, made in accordance with the present invention, can be made which have high selectivity and permeability relative to conventional membranes. In a preferred embodiment, the membranes are useful for separating a gaseous mixture containing carbon dioxide and methane.

U.S. Patent Application entitled "Mixed Matrix Membranes With Low Silica-to-Alumino Ratio Molecular Sieves and Methods for Making and Using the Membranes", which is being filed concurrently herewith, is hereby incorporated by reference in its entirety.

I. Polymer Selection

An appropriately selected polymer can be used which permits passage of the desired gases to be separated, for example carbon dioxide and methane. Preferably, the polymer permits one or more of the desired gases to permeate through the polymer at different diffusion rates than other components, such that one of the individual gases, for example carbon dioxide, diffuses at a faster rate than methane through the polymer.

For use in making mixed matrix membranes for separating $CO_2$ and $CH_4$, the most preferred polymers include Ultem® 1000, Matrimid® 5218, 6FDA/BPDA-DAM, 6FDA-6FpDA, and 6FDA-IPDA (all polyimides). 6FDA/BPDA-DAM and 6FDA-IPDA are available from E.I. du Pont de Nemours and Company of Wilmington, Del. and are described in U.S. Pat. No. 5,234,471. Matrimid® 5218 is commercially available from Advanced Materials of Brewster, N.Y. Ultem® 1000 may be obtained commercially from General Electric Plastics of Mount Vernon, Ind.

Examples of suitable polymers include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like. It is preferred that the membranes exhibit a carbon dioxide/methane selectivity of at least about 10, more preferably at least about 20, and most preferably at least about 30.

Preferably, the polymer is a rigid, glassy polymer as opposed to a rubbery polymer or a flexible glassy polymer. Glassy polymers are differentiated from rubbery polymers by the rate of segmental movement of polymer chains. Polymers in the glassy state do not have the rapid molecular motions that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature ($T_g$) is the dividing point between the rubbery or glassy state. Above the $T_g$, the polymer exists in the rubbery state; below the $T_g$, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures ($T_g$>150° C.).

In rigid, glassy polymers, the diffusion coefficient tends to dominate, and glassy membranes tend to be selective in favor of small, low-boiling molecules. The preferred membranes are made from rigid, glassy polymer materials that will pass carbon dioxide (and nitrogen) preferentially over methane and other light hydrocarbons. Such polymers are well known in the art and are described, for example, in U.S. Pat. No. 4,230,463 to Monsanto and U.S. Pat. No. 3,567,632 to DuPont. Suitable membrane materials include polyimides, polysulfones and cellulosic polymers.

II. Molecular Sieves

Molecular sieves are believed to improve the performance of the mixed matrix membrane by including selective holes/pores with a size that permits a gas such as carbon dioxide to pass through, but either not permitting another gas such as methane to pass through, or permitting it to pass through at a significantly slower rate. The molecular sieves should have higher selectivity for the desired gas separation than the original polymer to enhance the performance of the mixed matrix membrane. For the desired gas separation in the mixed matrix membrane, it is preferred that the steady-state permeability of the faster permeating gas component in the molecular sieves be at least equal to that of the faster permeating gas in the original polymer matrix phase.

Molecular sieves may be characterized as being "large pore", "medium pore" or "small pore" molecular sieves. As used herein, the term "large pore" refers to molecular sieves which have greater than or equal to 12-ring openings in their framework structure, the term "medium pore" refers to molecular sieves which have 10-ring openings in their framework structure, and the term "small pore" refers to molecular sieves which have less than or equal to 8-ring openings in their framework structure. In addition, the term "unidimensional" or "unidimensional pores" refers to the fact that the pores in the molecular sieves are essentially parallel and do not intersect. The term "multidimensional" or "multidimensional pores" refers to pores which intersect with each other. The molecular sieves of the present invention may be 2-dimensional, but most preferably are 3-dimensional. It is believed that this multi-dimensional character will allow for better diffusion through the sieves and the membrane.

A pore system is generally characterized by a major and a minor dimension. For example, molecular sieves having the IUPAC structure of ERI have a major diameter of 5.1 angstroms and a minor diameter of 3.6 angstroms. In some cases, molecular sieves can have 1, 2 or even three different pore systems. While not wishing to be restricted to a particular theory, it is believe that the pore system with the largest minor free crystallographic diameter will effectively control the diffusion rate through the molecular sieves. As an example, molecular sieves having a GIS structure have two pore systems with major and minor diameters of 4.5×3.1 angstroms and 4.8×2.8 angstroms. In this case, the controlling effective minor diameter is believed to be that of the pore system having the largest minor diameter, i.e., the pore system having the major and minor crystallographic free diameters of 4.5×3.1 angstroms. Accordingly, for the purposes of this invention, the largest minor crystallographic free diameter for the GIS structure is 3.1 angstroms.

Ideally, the overall particle size of the molecular sieves will be small as well. Size refers to a number average particle size. As used herein, the symbol "µ" represents a measure of length in microns or, in the alternative, micrometers. In terms of particle size of the small particles described herein, this measure of length is a measure of the nominal or average diameters of the particles, assuming that they approximate a spherical shape, or, in the case of elongated particles the length is the particle size.

A variety of analytical methods are available to practitioners for determining the size of small particles. One such method employs a Coulter Counter, which uses a current generated by platinum electrodes on two sides of an aperture to count the number, and determine the size, of individual particles passing through the aperture. The Coulter Counter is described in more detail in J. K. Beddow, ed., Particle Characterization in Technology, Vol 1, Applications and Microanalysis, CRC Press, Inc, 1984, pp. 183–6, and in T. Allen, Particle Size Measurement, London: Chapman and Hall, 1981, pp. 392–413. A sonic sifter, which separates particles according to size by a combination of a vertical oscillating column of air and a repetitive mechanical pulse on a sieve stack, can also be used to determine the particle size distribution of particles used in the process of this invention. Sonic sifters are described in, for example, T. Allen, Particle Size Measurement, London: Chapman and Hall, 1981, pp. 175–176. The average particle size may also be determined by a laser light scattering method, using, for example, a Malvern MasterSizer instrument. An average particle size may then be computed in various well-known ways, including:

$$\text{Number Average} = \frac{\sum_{i=1}^{n} (z_i \times L_i)}{\sum_{i=1}^{n} z_i}$$

wherein $z_i$ is the number of particles whose length falls within an interval $L_1$. For purposes of this invention, average particle size will be defined as a number average.

The size is ideally between 0.2–3.0 microns, more preferably between 0.2–1.5 microns, and even more preferably between 0.2–0.7 microns. Smaller particle sizes are believed to facilitate better adhesion between the molecular sieves and the polymer. Preferably, the molecular sieves are synthesized to have a number average particle size of less than 1 micron and more preferably, less than 0.5 microns. Although less preferred, the particle size can be reduced after synthesis such as by high shear wet milling or by ball milling.

Molecular sieve structure types can be identified by their structure type code as assigned by the IZA Structure Commission following the rules set up by the IUPAC Commission on Zeolite Nomenclature. Each unique framework topology is designated by a structure type code consisting of three capital letters. Preferred molecular sieves used in the present invention include molecular sieves having IZA structural designations of ERI, DDR, RHO, PAU, LEV, MER, AFX, AFT, and GIS. Exemplary compositions of such small pore alumina containing molecular sieves include non-zeolitic molecular sieves (NZMS) comprising certain aluminophosphates (AlPO's), silicoaluminophosphates (SAPO's), metallo-aluminophosphates (MeAPO's), elementaluminophosphates (ElAPO's), metallo-silicoaluminophosphates (MeAPSO's) and elementalsilicoaluminophosphates (ElAPSO's).

More particularly, the preferred non-zeolite molecular sieves may have the following compositions: AlPO-17, SAPO-17, MeAPSO-17, CVX-7, ZSM-58, LZ-214, ECR-18, SAPO-35, Zeolite W, SAPO-56, AlPO-52, and SAPO-43.

U.S. Pat. No. 4,440,871, issued on Apr. 3, 1984 to Lok et al., the entire disclosure of which is incorporated herein by reference, describes a class of silicon-substituted aluminophosphate non-zeolitic molecular sieves (SAPO's) which are both microporous and crystalline. These materials have a three-dimensional crystal framework of [$PO_2$], [$AlO_2$] and [$SiO_2$] tetrahedral units and, exclusive of any alkali metal or calcium which may optionally be present, an as-synthesized empirical chemical composition on an anhydrous basis of:

mR:($Si_xAl_yP_z$)$O_2$ wherein "R" represents at least one organic templating agent present in the intracrystalline pore system; "m" represents the moles of "R" present per mole of ($Si_xAl_yP_z$)$O_2$ and has a value of from zero to 0.3, the maximum value in each case depending upon the molecular dimensions of the templating agent and the available void volume of the pore system of the particular silicoaluminophosphate species involved; and "x", "y", and "z" represent the mole fractions of silicon, aluminum and phosphorus, respectively, present as tetrahedral oxides. The minimum value for each of "x", "y", and "z" is 0.01 and preferably 0.02. The maximum value for "x" is 0.98; for "y" is 0.60; and for "z" is 0.52. These silicoaluminophosphates exhibit several physical and chemical properties which are characteristic of both aluminosilicate zeolites and aluminophosphates.

U.S. Pat. No. 4,310,440, to Wilson et al., which is hereby incorporated by reference in its entirety, teaches the synthesis of aluminophosphates (ALPO's). The teachings of this reference are hereby incorporated by reference in its entirety. The generic class of aluminophosphates have an essential crystalline framework structure whose chemical composition expressed in terms of molar ratios of oxides, is $$Al_2O_3:1.0\pm0.2P_2O_5;$$

the framework structure being microporous in which the pores are uniform and in each species have nominal diameters within the range of from 3 to 10 Angstroms; an intracrystalline adsorption capacity for water at 4.6 torr and 24° C. of at least 3.5 wt. %, the adsorption of water being completely reversible while retaining the same essential framework topology in both the hydrated and dehydrated state. By the term "essential framework topology" is meant the spatial arrangement of the primary Al—O and P—O bond linkages. No change in the framework topology indicates that there is no disruption of these primary bond linkages.

The aluminophosphates are prepared by hydrothermal crystallization of a reaction mixture prepared by combining a reactive source of phosphate, alumina and water and at least one structure-directing or templating agent which can include an organic amine and a quaternary ammonium salt. In the as-synthesized form the structure-directing agent is contained within the framework structure of the aluminophosphate in amounts which vary from species to species but usually does not exceed one mole per mole of $Al_2O_3$ thereof. This structure-directing agent is readily removed by water washing or calcination and does not appear to be an essential constituent of the product aluminophosphate as evidenced by essentially complete absence of ion-exchangeability of the as-synthesized compositions and also the absence of any internally-contained organic molecules in the as-synthesized form of at least one species of the generic class. Evidence that a structure-directing agent is a critical constituent is contained in certain of the illustrative examples appearing hereinafter, wherein reaction mixtures otherwise identical to those which yield products of the present invention except for the presence of templating agents, yield instead the previously known aluminophosphate phases $AlPO_4$-tridymite, $AlPO_4$-quartz and $AlPO_4$-cristobalite.

Broadly the preparative process comprises forming a reaction mixture which in terms of molar ratios of oxides is $$Al_2O_3:1\pm0.5P_2O_5:7-100H_2O$$

and containing from about 0.2–2.0 moles of templating agent per mole of $Al_2O_3$. The reaction mixture is placed in a reaction vessel inert toward the reaction system and heated at a temperature of at least about 100° C., preferably between 100° C. and 300° C., until crystallized, usually a period from two hours to two weeks. The solid crystalline reaction product is then recovered by any convenient method, such as filtration or centrifugation, washed with water and dried at a temperature between ambient and 110° C. in air.

U.S. Pat. No. 4,567,029, issued on Jan. 28, 1986 to Wilson et al., the entire disclosure of which is incorporated herein by reference, describes a class of crystalline metal aluminophosphate non-zeolitic molecular sieves (designated therein as "MeAPO") having three-dimensional microporous framework structures of $[MO_2]$, $[AlO_2]$ and $[PO_2]$ tetrahedral units and having an empirical chemical composition on an anhydrous basis expressed by the formula:

$$mR:(M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3; "M" represents at least one metal of the group magnesium, manganese, zinc and cobalt; and "x", "y", and "z" represent the mole fractions of the metal "M", aluminum and phosphorus, respectively, present as tetrahedral oxides.

U.S. Pat. No. 4,973,785, issued on Nov. 27, 1990 to Lok et al., the entire disclosure being incorporated herein by reference, discloses a class of crystalline non-zeolitic molecular sieves, designated therein as "ElAPSO". The ElAPSO compositions are formed with elements capable of forming framework oxide units in the presence of $[AlO_2]$, $[SiO_2]$ and $[PO_2]$ tetrahedral units where element "El" is at least one element capable of forming a three-dimensional oxide framework in the presence of aluminum, phosphorus and silicon oxide units and is capable of forming stable El-O—P, El-O-AL, and El-O-El bonds in crystalline three-dimensional oxide structures.

When these molecular sieves are properly interspersed within a continuous phase polymer, the membrane will exhibit a mixed matrix effect even without silanation. The molecular sieves have pores with a largest minor crystallographic free diameter of 3.6 Angstroms or less. The minor crystallographic free diameter of pores of these molecular sieves may be as small as 3.6 Å, 3.4 Å, or even as small as 3.0 Å. In some instances, it is advantageous to have pores which are generally elliptical or oblong in cross-section rather than circular.

By way of example rather than limitation, examples of small pore alumina containing molecular sieves which may be used in the present invention are included in Table 1 below. Table 1 includes U.S. patents and literature references which describe how the molecular sieves may be synthesized. These U.S. Patents and the literature references are hereby incorporated by reference in their entireties.

The most preferred molecular sieve for use in this invention is that of CVX-7, which is an ERI structured silicoaluminophosphate molecular sieve. A more detailed description of the synthesis of the preferred CVX-7 is described below in Example 4. Also, highly preferred sieves include SAPO-17, MeAPSO-17. The MeAPSO-17 molecular sieves can have, by way of example and not limitation, metal constituents including titanium, magnesium, chromium, nickel, iron, cobalt, and vanadium.

TABLE 1

Small Pore Molecular Sieves

| IZA Structure Type | Material | Major and Minor Crystallographic Free Diameters of Pores (Angstroms) | Synthesis described in Reference |
|---|---|---|---|
| ERI | AlPO-17 | 5.1 × 3.6 | U.S. Pat. No. 4,503,023 |
| ERI | SAPO-17 | 5.1 × 3.6 | U.S. Pat. No. 4,778,780 and 4,440,871 |
| ERI | CVX-7 | 5.1 × 3.6 | Described below in Example 3 |
| DDR | ZSM-58 | 4.4 × 3.6 | U.S. Pat. No. 4,698,217 |
| RHO | LZ-214 | 3.6 × 3.6 | U.S. Pat. No. 4,503,023 |
| PAU | ECR-18 | 3.6 × 3.6 | U.S. Pat. No. 4,661,332 |
| LEV | SAPO-35 | 4.8 × 3.6 | U.S. Pat. No. 4,440,871 |
| MER | Zeolite W | 5.1 × 3.4<br>3.5 × 3.1<br>3.6 × 2.7 | Sherman, J. D., ACS Sym. Ser., 40, 30 (77). |
| AFX | SAPO-56 | 3.6 × 3.4 | U.S. Pat. No. 5,370,851 |
| AFT | AlPO-52 | 3.8 × 3.2 | U.S. Pat. No. 4,851,204 |
| GIS | SAPO-43 | 4.5 × 3.1<br>4.8 × 2.8 | U.S. Pat. No. 4,440,871 |

III. Methods of Forming Mixed Matrix Membrane

The molecular sieves can optionally, but preferably, be "primed" (or "sized") by adding a small amount of the desired matrix polymer or any suitable "sizing agent" that will be miscible with the organic polymer to be used for the matrix phase. Generally, this small amount of polymer or "sizing agent" is added after the molecular sieves have been dispersed in a suitable solvent and sonicated by an ultrasonic agitator source. Optionally, a non-polar non-solvent, in which the polymer or "sizing agent" is insoluble, may be added to the dilute suspension to initiate precipitation of the polymer onto the molecular sieves. The "primed" molecular sieves may be removed through filtration and dried by any conventional means, for example in a vacuum oven, prior to re-dispersion in the suitable solvent for casting. The small amount of polymer or "sizing agent" provides an initial thin coating (i.e., boundary layer) on the molecular sieve surface that will aid in making the particles compatible with the polymer matrix.

In a preferred embodiment, approximately 10% of total polymer material amount to be added for the final mixed matrix membrane is used to "prime" the molecular sieves. The slurry is agitated and mixed for preferably between about six and seven hours. After mixing, the remaining amount of polymer to be added is deposited into the slurry. The quantity of molecular sieves and the amount of polymer added will determine the "loading" (or solid particle concentration) in the final mixed matrix membrane. Without limiting the invention, the loading of molecular sieves is preferably from about 10 vol. % to about 60 vol. %, and more preferably, from about 20 vol. % to about 50 vol. %. To achieve the desired viscosity, the polymer solution concentration in the solvent is preferably from about 5 wt. % to about 25 wt. %. Finally, the slurry is again well agitated and mixed by any suitable means for about 12 hours.

This technique of "priming" the particles with a small amount of the polymer before incorporating the particles into a polymer film is believed to make the particles more compatible with the polymer film. It is also believed to promote greater affinity/adhesion between the particles and the polymers and may eliminate defects in the mixed matrix membranes.

The mixed matrix membranes are typically formed by casting the homogeneous slurry containing particles and the desired polymer, as described above. The slurry can be mixed, for example, using homogenizers and/or ultrasound to maximize the dispersion of the particles in the polymer or polymer solution. The casting process is preferably performed by three steps:

(1) pouring the solution onto a flat, horizontal surface (preferably glass surface);
(2) slowly and virtually completely evaporating the solvent from the solution to form a solid membrane film; and
(3) drying the membrane film.

To control the membrane thickness and area, the solution is preferably poured into a metal ring mold. Slow evaporation of the solvent is preferably effected by covering the area and restricting the flux of the evaporating solvent. Generally, evaporation takes about 12 hours to complete, but can take longer depending on the solvent used. The solid membrane film is preferably removed from the flat surface and placed in a vacuum oven to dry. The temperature of the vacuum oven is preferably set from about 50° C. to about 110° C. (or about 50° C. above the normal boiling point of the solvent) to remove remaining solvent and to anneal the final mixed matrix membrane.

The final, dried mixed matrix membrane can be further annealed above its glass transition temperature ($T_g$). The $T_g$ of the mixed matrix membrane can be determined by any suitable method (e.g., differential scanning calorimetry). The mixed matrix film can be secured on a flat surface and placed in a high temperature vacuum oven. The pressure in the vacuum oven (e.g., Thermcraft® furnace tube) is preferably between about 0.01 mm Hg to about 0.10 mm Hg. Preferably, the system is evacuated until the pressure is 0.05 mm Hg or lower. A heating protocol is programmed so that the temperature reaches the $T_g$ of the mixed matrix membrane preferably in about two to three hours. The temperature is then raised to preferably about 10° C. to about 30° C., but most preferably about 20° C., above the $T_g$ and maintained at that temperature for about 30 minutes to about two hours. After the heating cycle is complete, the mixed matrix membrane is allowed to cool to ambient temperature under vacuum.

The resulting mixed matrix membrane is an effective membrane material for separation of one or more gaseous components from gaseous mixtures including the desired component(s) and other components. In a non-limiting example of use, the resulting membrane has the ability to separate carbon dioxide from methane, is permeable to these substances, and has adequate strength, heat resistance, durability and solvent resistance to be used in commercial purifications.

IV. Separation Systems Including the Membranes

The membranes may take any form known in the art, for example hollow fibers, tubular shapes, and other membrane shapes. Some other membrane shapes include spiral wound, pleated, flat sheet, or polygonal tubes. Multiple hollow fiber membranes can be preferred for their relatively large fluid contact area. The contact area may be further increased by adding additional tubes or tube contours. Contact may also be increased by altering the gaseous flow by increasing fluid turbulence or swirling.

For flat-sheet membranes, the thickness of the mixed matrix selective layer is between about 0.001 and 0.005 inches, preferably about 0.002 inches. In asymmetric hollow fiber form, the thickness of the mixed matrix selective skin layer is preferably about 1,000 Angstroms to about 5,000 Angstroms. The loading of molecular sieves in the continuous polymer phase is between about 10% and 60%, and more preferably about 20% to 50% by volume. The preferred glassy materials that provide good gas selectivity, for example carbon dioxide/methane selectivity, tend to have relatively low permeabilities. A preferred form for the membranes is, therefore, integrally skinned or composite asymmetric hollow fibers, which can provide both a very thin selective skin layer and a high packing density, to facilitate use of large membrane areas. Hollow tubes can also be used.

Sheets can be used to fabricate a flat stack permeator that includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are hereby incorporated by reference.

The membranes can be included in a separation system that includes an outer perforated shell surrounding one or more inner tubes that contain the mixed matrix membranes. The shell and the inner tubes can be surrounded with packing to isolate a contaminant collection zone.

In one mode of operation, a gaseous mixture enters the separation system via a containment collection zone through the perforations in the outer perforated shell. The gaseous mixture passes upward through the inner tubes. As the gaseous mixture passes through the inner tubes, one or more components of the mixture permeate out of the inner tubes through the selective membrane and enter the containment collection zone.

The membranes can be included in a cartridge and used for permeating contaminants from a gaseous mixture. The contaminants can permeate out through the membrane, while the desired components continue out the top of the membrane. The membranes may be stacked within a perforated tube to form the inner tubes or may be interconnected to form a self-supporting tube.

Each one of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones.

The membranes may be arranged in series or parallel configurations or in combinations thereof depending on the particular application.

The membranes may be removable and replaceable by conventional retrieval technology such as wire line, coil tubing, or pumping. In addition to replacement, the membrane elements may be cleaned in place by pumping gas, liquid, detergent, or other material past the membrane to remove materials accumulated on the membrane surface.

A gas separation system including the membranes described herein may be of a variable length depending on the particular application. The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

In order to prevent or reduce possibly damaging contact between liquid or particulate contaminates and the membranes, the flowing gaseous mixture may be caused to rotate or swirl within an outer tube. This rotation may be achieved in any known manner, for example using one or more spiral deflectors. A vent may also be provided for removing and/or sampling components removed from the gaseous mixture.

V. Purification Process

A mixture containing gases to be separated, for example carbon dioxide and methane, can be enriched by a gas-phase process through the mixed matrix membrane, for example, in any of the above-configurations.

The preferred conditions for enriching the mixture involve using a temperature between about 25° C. and 200° C. and a pressure of between about 50 psia and 5,000 psia. These conditions can be varied using routine experimentation depending on the feed streams.

Other gas mixtures can be purified with the mixed matrix membrane in any of the above configurations. For example, applications include enrichment of air by nitrogen or oxygen, nitrogen or hydrogen removal from methane streams, or carbon monoxide from syngas streams. The mixed matrix membrane can also be used in hydrogen separation from refinery streams and other process streams, for example from the dehydrogenation reaction effluent in the catalytic dehydrogenation of paraffins. Generally, the mixed matrix membrane may be used in any separation process with gas mixtures involving, for example, hydrogen, nitrogen, methane, carbon dioxide, carbon monoxide, helium, and oxygen. Also, the membranes can be used to separate ethylene from ethane and propylene from propane. The gases that can be separated are those with kinetic diameters that allow passage through the molecular sieves. The kinetic diameter (also referred to herein as "molecular size") of gas molecules are well known, and the kinetic diameters of voids in molecular sieves are also well known, and are described, for example, in D. W. Breck, Zeolite Molecular Sieves, Wiley (1974), the contents of which are hereby incorporated by reference.

VI. Membrane Evaluation

Permeability measurements of the flat mixed matrix membrane films can be made using a manometric, or constant volume, method. The apparatus for performing permeation measurements on dense, flat polymeric films are described in O'Brien et al., *J. Membrane Sci.*, 29, 229 (1986) and Costello et al., *Ind. Eng. Chem. Res.*, 31, 2708 (1992), the contents of which are hereby incorporated by reference. The permeation system includes a thermostated chamber containing two receiver volumes for the upstream and downstream, a membrane cell, a MKS Baratron® absolute pressure transducer (0–10 torr or 0–100 torr range) for the downstream, an analog or digital high pressure gauge (0–1000 psia) for the upstream, welded stainless steel tubing, Nupro® bellows seal valves, and Cajon VCR® metal face seal connections. The chamber temperature can be regulated for permeation measurements ranging from 25° C. to 75° C.

The schematic of the permeation testing apparatus is shown in FIG. 1, where 1 is a heated chamber, 2 is a supply gas cylinder, 3 is a vacuum pump, 4 is the feed receiver volume, 5 is the permeate receiver volume, 6 is a pressure transducer, 7 is a membrane cell, 8 is a thermostat-controlled heater, 9 is a fan and 10 is a pressure gauge.

Flat membrane films can be masked with adhesive aluminum masks having a circular, pre-cut, exposed area for permeation through the membrane. Application of five minute epoxy at the interface between membrane and the aluminum mask is also used to prevent non-selective gas flow between the aluminum mask adhesive and membrane. Membrane thickness (by high-resolution micrometer) and membrane permeation surface area (by image scanning and area-calculating software) are measured.

After drying the epoxy for approximately 12 to about 24 hours, the masked membrane can be placed in a permeation cell and the permeation system. Both the upstream and downstream sections of the permeation system were evacuated for about 24 hours to 48 hours to remove ("degas") any gases or vapors sorbed into the membrane. Permeation tests of the membrane can be performed by pressurizing the upstream with the desired gas (pure gas or gas mixture) at the desired pressure. The permeation rate can be measured from the pressure rise of the MKS Baratron® absolute pressure transducer over time and using the known downstream (permeate) volume. The pressure rise data are logged by high-precision data acquisition hardware/software (or alternatively, plotted on a speed-regulated strip chart recorder). When testing gas mixture feeds, the permeate stream is analyzed by gas chromatography to determine composition. Following the permeation testing of a given gas, both the upstream and downstream sections were evacuated overnight before permeation testing of the next gas.

For the purposes of this invention, a mixed matrix membrane shall be referred to as exhibiting a mixed matrix effect if it enhances the selectivity of gas separation by at least 10 percent relative to a neat membrane. A test can be prepared to verify that the molecular sieves have been properly and successfully made to produce mixed matrix membranes with enhanced permeation properties. This test involves preparation of a sample mixed matrix membrane film using a test polymer and a specified loading of molecular sieve particles, and comparing the $CO_2/CH_4$ permeation selectivity versus a membrane film of the same test polymer without added sieve. The $CO_2/CH_4$ permeation selectivity is determined by taking the ratio of the permeability of $CO_2$ over that of $CH_4$. The permeability of a gas penetrant "i" is a pressure- and thickness-normalized flux of the component through the membrane and is defined by the expression:

$$P_i = \frac{N_i \cdot l}{\Delta_{pi}}$$

where $P_i$ is permeability of component i, l is thickness of the membrane layer, $N_i$ is component i's flux (volumetric flow rate per unit membrane area) through the membrane, and $\Delta_{pi}$ is the partial pressure driving force of component i (partial pressure difference between the upstream to the downstream). Permeability is often expressed in the customary unit of Barrer (1 Barrer=$10^{-10}$ cm$^3$ (STP)·cm/cm$^2$·s·cm Hg). Permeability measurements can be made using a manometric, or constant volume, method. The apparatus for performing permeation measurements in films is described in O'Brien et al., *J. Membrane Sci.*, 29, 229 (1986) and Costello et al., *Ind. Eng. Chem. Res.*, 31, 2708 (1992), the contents of which are hereby incorporated by reference.

In the Mixed Matrix Enhancement Test, permeation tests of pure gases of $CO_2$ and $CH_4$, or gas mixture (e.g., 10% $CO_2$/90% $CH_4$) are performed on the mixed matrix membrane. The mixed matrix membrane film is separately tested with each gas using an upstream pressure of about 50 psia and a vacuum downstream. A temperature of about 35° C. is maintained inside the permeation system. Similar permeation tests of pure gases of $CO_2$ and $CH_4$ or gas mixture (e.g., 10% $CO_2$/90% $CH_4$) are performed on a prepared membrane film of the same test polymer without added sieve particles. To confirm that the molecular sieve particles have been properly produced and prepared by the methods described herein, the mixed matrix membrane film should exhibit a $CO_2/CH_4$ selectivity enhancement in the Mixed Matrix Enhancement Test, of 10% or more over the $CO_2/CH_4$ selectivity of the pure test polymer membrane alone.

The method for forming the sample mixed matrix membrane for use in the Enhancement Test is as follows:

(1) The fine particles are preconditioned at high temperature in a vacuum oven at a temperature of about 300° C. under vacuum for at least 12 hours. After the preconditioning treatment, these sieve particles can be used to prepare a sample mixed matrix membrane film. For the purpose of the Enhancement Test, the particles are dispersed in the solvent dichloromethane ($CH_2Cl_2$).

(2) After dispersal in $CH_2Cl_2$, the sieve particles are sonicated in solution for about one minute with an ultrasonic rod in the vial and are well-mixed, as described previously. Large sieve particles in the slurry are separated from the fine particles by any conventional means, for example, decantation or centrifugation. After sonication and isolation of finer sieve particles, the sieve particles are ready for "priming" (or "sizing") with the matrix polymer. For the purpose of the Enhancement Test, the polymer to be used for the matrix phase is Ultem® 1000 (GE Plastics).

Prior to use, the Ultem® 1000 polymer is dried at a temperature of about 100° C. under vacuum for at least 12 hours in a vacuum oven. For "priming" the sieve particles, typically 10 wt. % of the total amount of matrix polymer (Ultem® 1000) to be added to the slurry is used. For the Enhancement Test, it is desired to prepare the final slurry of sieve particles and polymer with the following properties: a weight ratio of Ultem® 1000 to particles of about 4 to 1 (i.e., a "loading" of about 20 wt. % of sieve particles in the final mixed matrix membrane) and a slurry concentration of about 15 to about 20 wt. % solids (sieve particles and polymer) in $CH_2Cl_2$ solvent. After "priming" the sieve particles with Ultem® 1000, the slurry is well-mixed by any conventional means for about 12 hours. The remaining amount of Ultem® 1000 polymer is added to the slurry, and the final slurry is again well-mixed by any conventional means for about 12 hours.

(3) The polymer/sieve particle slurry is poured onto a flat, leveled, clean horizontal glass surface placed inside a controlled environment (e.g., plastic glove bag). To decrease the evaporation rate, the controlled environment is near-saturated with $CH_2Cl_2$ solvent. A stainless steel film applicator (Paul N. Gardner Co.) is used to draw/spread the sieve particle/polymer slurry to a uniform thickness. An inverted glass funnel was used to cover the solution. The tip of the funnel is covered with lint-free tissue paper to further control the evaporation rate. The solvent from the polymer film slowly evaporates over about a 12-hour time period. The dried film approximately has a thickness of about 30 to about 60 microns. After drying, the membrane film is annealed at a temperature of about 100° C. for about 12 hours in vacuum.

(4) To perform the Enhancement Test, permeability measurements of the flat mixed matrix membrane films are required. The measurements can be made using a manometric, or constant volume, method. The apparatus is described in references previously cited in this section. A sample film area from final mixed matrix film is masked with adhesive aluminum masks having a circular, pre-cut, exposed area for permeation through the membrane. The masked membrane can be placed in a permeation cell and the permeation system. Both the upstream and downstream sections of the permeation system are evacuated for about 24 hours to 48 hours to remove ("degas") any gases or vapors sorbed into the membrane. Permeation tests of the membrane can be performed by pressurizing the upstream side with the desired gas at the desired pressure. The permeation rate can be measured from the pressure rise of a pressure transducer and using the known downstream (permeate) volume. Following the permeation testing of a given gas, both the upstream and downstream sections are evacuated for at least 12 hours before permeation testing of the next gas.

With the above procedure, the $CO_2$ and $CH_4$ permeabilities are measured for the test mixed matrix membrane and the pure test polymer (Ultem® 1000). The $CO_2/CH_4$ selectivity of the mixed matrix membrane is compared to the $CO_2/CH_4$ selectivity of the pure test polymer (Ultem® 1000) alone. A $CO_2/CH_4$ selectivity enhancement of 10% or more should be observed in the mixed matrix membrane film.

VII. EXAMPLES

Comparative Example 1

Neat Polymer Membrane Film

Ultem® 1000 is a polyetherimide and is commercially available from General Electric Plastics of Mount Vernon, Ind. Its chemical structure is shown below:

A neat Ultem® 1000 membrane film was formed via solution casting. Ultem® 1000 was first dried in a vacuum oven at 110° C. for overnight. Next, 0.55 grams of the dried Ultem® 1000 polymer were added to 5 mL of $CH_2Cl_2$ solvent in a 40 mL vial. The vial was well-agitated and mixed on a mechanical shaker for about 1 hour to ensure that polymer was dissolved in solution. The polymer solution was poured onto a flat, clean, horizontal, leveled glass surface placed inside a controlled environment (e.g., plastic glove bag). A casting/doctor blade was used to draw down or "cast" the solution, forming a uniform-thickness wet film. The liquid film was covered with an inverted glass cover dish to slow evaporation and to prevent contact with dust, etc. The solvent from the polymer film slowly evaporated over about a 12-hour time period. The dried film, measuring about 30 microns in thickness, was removed from the glass substrate. The resulting neat Ultem® 1000 film was dried for about 12 hours in a vacuum oven at 150° C.

The permeation properties of a neat polymer film of Ultem® 1000 were determined using the apparatus and procedure described in the previous "Membrane Evaluation" section. A gas mixture containing 10% $CO_2$/90% $CH_4$ was used as the feed gas during the permeation testing. The upstream side of the neat Ultem® 1000 film was exposed to this gas mixture at a pressure of 50 psia. The downstream side of the neat Ultem® 1000 was maintained at a vacuum, resulting in a differential pressure driving force of 50 psia across the neat Ultem® 1000 membrane film. With the permeation system maintained at a constant temperature of 35° C., the permeation rate of gases through the membrane was measured with a pressure-rise method and the composition of the permeate gas was analyzed with gas chromatography (HP 6890). Results are shown in Table 2 with the individual gas permeabilities and overall selectivity between the gases.

TABLE 2

| | Neat Ultem ® 1000 Membrane | |
|---|---|---|
| Gas Component | Permeability ($10^{-10}$ cm$^3$ (STP) · cm/ cm$^2$ · s · cm Hg) | Selectivity |
| $CH_4$ | 0.038 | $CO_2/CH_4$ = 39.2 |
| $CO_2$ | 1.49 | |

From the permeability values in Table 2, the permeability ratios (selectivity) of the neat Ultem® 1000 membrane film for $CO_2/CH_4$ at 35° C. was 39.2.

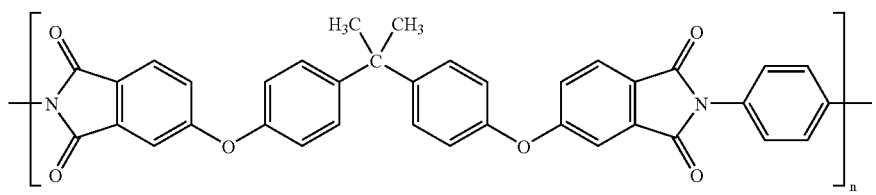

Comparative Example 2

Mixed Matrix Membrane Containing Silanated SSZ-13

SSZ-13 zeolite particles were prepared in accordance with the method described in U.S. Pat. No. 4,544,538. The silica-to-alumina molar ratio of these molecular sieves was about 25 as measured by ICP bulk elemental analysis. The SSZ-13 has an IUPAC structure of CHA with major and minor crystallographic free diameters comprising 3.8×3.8 Å. The SSZ-13 zeolite particles were surface-modified with a silane coupling agent. The silane coupling agent used was 3-aminopropyldimethylethoxysilane (APDMES) and has the following chemical structure:

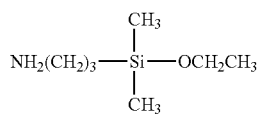

The silanation procedure was performed as follows. A 200 mL solution was prepared with 95:5 ratio (by volume) of isopropyl alcohol (ACS certified grade) and distilled water. In a separate 500 mL container, 4.0 grams of the silane coupling agent (3-aminopropyldimethylethoxysilane or APDMES) were added to 2 grams of SSZ-13 zeolite. The isopropanol solution prepared in the first step was added to this 500 mL container to form a slurry. The SSZ-13/APDMES/isopropanol/water slurry was sonicated with an ultrasonic horn (Sonics and Materials) in five minute intervals (5 minutes sonication followed by 5 minutes of resting) for a total time of 30 minutes sonication/30 minutes resting.

After sonication, the slurry was centrifuged at a high velocity (~9000 rpm) for one hour, leaving precipitated solids at the bottom and an isopropanol/water liquid mixture on top. Once the centrifuging was completed, the isopropanol/water liquid was decanted, leaving behind precipitated solid (APDMES-silanated SSZ-13) at the bottom. 100 mL of fresh isopropanol was added to the precipitated solid forming a slurry which was sonicated for one hour according to the third step above (30 minutes sonication/30 minutes resting.) After sonication, the slurry was centrifuged at high velocity (~9,000 rpm) for one hour, leaving precipitated solids (APDMES-silanated SSZ-13) at the bottom and isopropanol liquid on top. The above centrifugation procedure was repeated with two additional aliquots of isopropanol. The APDMES-silanated SSZ-13 particles were scraped from the container onto an aluminum foil-lined Petri dish and dried in a vacuum oven for overnight at 150° C. The sieves were set aside until ready to incorporate into a film.

A mixed matrix membrane film was prepared with the APDMES-silanated SSZ-13 particles (prepared from the above steps) as the disperse phase. Ultem® 1000, as described in Comparative Example 1, was used as the polymer matrix phase in the mixed matrix membrane. In this Example, the mixed matrix membrane film contained 18 wt. % APDMES-silanated SSZ-13 particles within the Ultem® 1000 matrix.

The mixed matrix membrane film was formed in the following steps. A total of 0.249 grams of the APDMES-silanated SSZ-13 particles (prepared from the silanation above) were added to a 40 mL vial containing about 5 mL of $CH_2Cl_2$ solvent. The particles in the slurry were sonicated for about two minutes with a high-intensity ultrasonic horn (VibraCell™, Sonics & Materials, Inc.) in the vial. The slurry was well agitated and mixed for about one hour on a mechanical shaker.

A total of 0.123 grams of the dried Ultem® 1000 polymerwas added to the slurry in the vial. The vial was well mixed for about two hours on a mechanical shaker. Next, 1.008 grams of dried Ultem® 1000 polymer were added to the slurry solution to form a solution with 18 wt. % loading of APDMES-silanated SSZ-13 particles. The vial was well mixed again for about 16 hours on a mechanical shaker. An enclosable plastic glove bag (Instruments for Research and Industry®, Cheltenham, Pa.) was setup and near-saturated with about 200 mL of $CH_2Cl_2$ solvent. The Ultem/APDMES-silanated SSZ-13 slurry solution was poured onto a flat, clean, horizontal, leveled glass surface placed inside the plastic glove bag. The near-saturated environment slows down the evaporation of $CH_2Cl_2$.

A casting/doctor blade was used to draw down or "cast" the solution, forming a uniform-thickness wet film. The resulting liquid film was covered with an inverted glass cover dish to further slow evaporation and to prevent contact with dust, etc. The $CH_2Cl_2$ solvent from the polymer film slowly evaporated over about a 12-hour time period. The dried film, measuring about 35 microns in thickness, was removed from the glass substrate. The resulting mixed matrix membrane film was dried for about 12 hours in a vacuum oven at 150° C.

A section from the Ultem® 1000-SSZ-13 mixed matrix film (18 wt. % SSZ-13) in this Example was cut to an appropriate size and dimension and used in a permeation testing cell (as described in the "Membrane Evaluation" section) to measure the permeabilities and separation factor for a mixed gas mixture containing 10% $CO_2$/90% $CH_4$. The upstream side of the Ultem® 1000-SSZ-13 mixed matrix membrane film was exposed to this gas mixture at a pressure of 50 psia. The downstream side of the Ultem® 1000-SSZ-13 mixed matrix membrane was maintained at a vacuum, resulting in differential pressure driving force of 50 psia across the Ultem® 1000-SSZ-13 mixed matrix membrane. With the permeation system maintained at a constant temperature of 35° C., the permeation rate of gases through the membrane was measured with a pressure-rise method and the composition of the permeate gas was analyzed with gas chromatography (HP 6890). Results are shown in Table 3 with the individual gas permeabilities and the overall selectivity.

TABLE 3

Ultem ® 1000-SSZ-13 Mixed Matrix Membrane

| Gas Component | Permeability ($10^{-10}$ $cm^3$ (STP) · cm/ $cm^2$ · s · cm Hg) | Selectivity |
| --- | --- | --- |
| $CH_4$ | 0.055 | $CO_2/CH_4$ = 51.1 |
| $CO_2$ | 2.81 | |

From the permeability values in Table 2, the permeability ratios (selectivity) of the Ultem® 1000-SSZ-13 mixed matrix membrane for $CO_2/CH_4$ is 51.1. Both the $CO_2/CH_4$ selectivity and $CO_2$ permeability of the Ultem® 1000-SSZ-13 mixed matrix membrane were enhanced over those measured for the neat Ultem® 1000 polymer membrane film, which was examined in Comparative Example 1.

For the Ultem® 1000-SSZ-13 mixed matrix membrane, the $CO_2/CH_4$ selectivity was 30% higher and the $CO_2$ permeability is 90% higher than such corresponding values in the neat Ultem® film of Comparative Example 1. Thus, this mixed matrix membrane exhibits a mixed matrix effect. Addition of these APDMES-silanated SSZ-13 zeolite particles provided beneficial performance enhancement to the mixed matrix membrane over the neat membrane.

Example 3

Synthesis of CVX-7

The silicoaluminophosphate molecular sieve, CVX-7, with Erionite framework structure was synthesized according to the following procedure. Initially, 634 grams of aluminum isopropoxide (Chattem Chemical, Inc), ground to 100(US) mesh, were added to 1,600 grams of de-ionized water with vigorous agitation. This mixture was stirred for two hours. Next, 352 grams of Orthophosphoric acid (85 wt. % in water, EMS) were slowly added to the aluminum isopropoxide/water mixture with intense agitation. The resulting mixture was blended vigorously for 30 minutes.

In the next step, 31.2 grams of Colloidal silica, LUDOX AS-30 (Du Pont), were added to the mixture with agitation followed by 64.8 grams of 48 wt. % Hydrofluoric acid, (Baker). The resulting mixture was stirred for one hour. Finally, 155 grams of cyclohexylamine, (Aldrich) were added to the mixture followed by stirring for 30 minutes. The preparation was seeded with 7 grams of as-made SAPO-17. This material was made according to U.S. Pat. No. 4,440,871. The pH of the final mixture was 4.8. 2,000 grams of the mixture were transferred into a one gallon stainless steel liner and the liner was placed into a stirred reactor. The material was synthesized at 200° C. with 150 rpm stirring over 42 hours.

The pH of the product mixture was 7.1. The product was separated from its mother-liquor by vacuum filtration followed by washing with 1.5 gallon of HCl/Methanol solution (1 part of methanol to 5 parts of 0.05M HCl) and rinsed with two gallons of water. The product was dried at room temperature overnight. Thereafter, the product was calcined with the temperature being ramped from room temperature to 630° C. at 1° C./minute. The mixture was held at 630° C. for six hours and then allowed to cool to room temperature. The PXRD pattern of the resulting product was of Erionite-type material. The product had a silica-to-alumina molar ratio of 0.1, as measured by ICP bulk elemental analysis.

The synthesis of CVX-7 differs from the normal synthesis of SAPO-17 in a number of ways. First, a small amount of SAPO-17 was used as seeds. The SAPO-17 seeds were phase pure according to PXRD and SEM. The term "pure phase" by PXRD means that at the conditions of the experiment (X-ray wavelength, beam intensity that is defined by anode voltage and current, slit sizes, and scan range) no lines in a diffraction pattern were detected that can not be attributed to erionite-type crystal structure.

The hydrolysis of aluminum isopropoxide was completed under vigorous agitation at room temperature. The SAPO-17 mixture is usually heated before it goes to an autoclave to remove isopropyl alcohol produced by the aluminum isopropoxide hydrolysis process. In the case of the CVX-7 synthesis, this step was omitted. The presence of isopropyl alcohol in the reaction mixture helps to reduce an average crystal size of the product from about 10 microns to about 1.5 microns and significantly reduce the aspect ratio of the crystals, as evident by SEM. To reduce the size of CVX-7 crystals, it is preferred to use good surface complexing agents that among others include organic species such as alcohols, amines, esters or glycols. While not wishing to be held to a particular theory, it is believed reduced aspect ratio aids in preventing the sieve particles from agglomerating, which is particularly valuable in fiber spinning operations. Smaller crystals aid in formation of relatively defect-free fibers.

Based on SEM results a maximum aspect ratio for CVX-7 was about 5:1 (length to width or diameter of a crystal). A typical ratio is about 2–2.5 to 1. For SAPO-17 a typical aspect ratio is about 10:1. Erionite crystals typically have needle-type morphology and thus very high aspect ratios. Ideally the aspect ratio for the sieve particles is less than 10, more preferably, less than 5 and most preferably, between 1 and 3.

Example 4

Mixed Matrix Membrane Containing CVX-7

A mixed matrix membrane was prepared using the non-silanated CVX-7 particles, as prepared from Example 4, as the disperse phase. As before, Ultem® 1000, as described in Comparative Example 1, was used as the polymer continuous matrix phase in the mixed matrix membrane. The mixed matrix membrane film containing 18 wt. % non-silanated CVX-7 particles within the Ultem® 1000 matrix was prepared in a similar fashion as described in Comparative Example 3. In other words, the CVX-7 particles were used "as synthesized" and were not further surface-modified with any silane coupling agent (i.e., non-silanated).

The mixed matrix membrane film was formed in the following steps. Initially, 0.250 grams of the non-silanated CVX-7 particles were added to a 40 mL vial containing about 5 mL of $CH_2Cl_2$ solvent to create a slurry. The particles in the slurry were sonicated for about two minutes with a high-intensity ultrasonic horn (VibraCell™, Sonics & Materials, Inc.) in the vial. The slurry was well agitated and mixed for about one hour on a mechanical shaker. 0.160 grams of the dried Ultem® 1000 polymer was added to the slurry in the vial. The vial was then well mixed for about two hours on a mechanical shaker. 1.003 grams of dried Ultem® 1000 polymer was added to the slurry solution to form a solution with 18 wt. % loading of non-silanated CVX-7 particles. The vial was well mixed again for about 16 hours on a mechanical shaker. An enclosable plastic glove bag (Instruments for Research and Industry®, Cheltenham, Pa.) was setup and near-saturated with about 200 mL of $CH_2Cl_2$ solvent.

The Ultem/non-silanated CVX-7 slurry solution was poured onto a flat, clean, horizontal, leveled glass surface placed inside the plastic glove bag. The near-saturated environment slows down the evaporation of $CH_2Cl_2$. A casting/doctor blade was used to draw down or "cast" the solution, forming a uniform-thickness wet film. The resulting liquid film was covered with an inverted glass cover dish to further slow evaporation and to prevent contact with dust, etc. The $CH_2Cl_2$ solvent from the polymer film slowly evaporated over about a 12-hour time period. The dried film, measuring about 35 microns in thickness, was removed from the glass substrate. The resulting mixed matrix membrane film was dried for about 12 hours in a vacuum oven at 150° C.

A section from the Ultem® 1000-CVX-7 mixed matrix film (18 wt. % non-silanated CVX-7) was tested as described in Example 2. Results are shown in Table 4 with the individual gas permeabilities.

TABLE 4

Ultem® CVX-7 Mixed Matrix Membrane

| Gas Component | Permeability ($10^{-10}$ cm$^3$ (STP) · cm/ cm$^2$ · s · cm Hg) | Selectivity |
|---|---|---|
| CH$_4$ | 0.049 | CO$_2$/CH$_4$ = 62.9 |
| CO$_2$ | 3.08 | |

The permeability ratio (selectivity) of the Ultem® 1000-CVX-7 mixed matrix membrane for CO$_2$/CH$_4$ was 62.9. Both the CO$_2$/CH$_4$ selectivity and CO$_2$ permeability of the Ultem® 1000-CVX-7 mixed matrix membrane were enhanced over those measured for the neat Ultem® 1000 film, which was examined in Comparative Example 1. Thus, this mixed matrix membrane exhibits a mixed matrix effect.

For this Ultem® 1000-CVX-7 mixed matrix membrane containing 18 wt. % CVX-7 zeolite, the CO$_2$/CH$_4$ selectivity is 60% higher and the CO$_2$ permeability was 107% higher than such corresponding values in the neat Ultem® 1000 film. Addition of these CVX-7 zeolite particles provided beneficial performance enhancement in membrane. Thus, these CVX-7 zeolite sieve particles are good candidates as the disperse phase ("inserts") in a mixed matrix membrane.

Note that the CVX-7 sieve particles, with a minor crystallographic free diameter of 3.6 Å, offer an advantage over SSZ-13 sieve particles in producing a greater CO$_2$/CH$_4$ selectivity at the same loading in the membrane.

Example 5

Preparation and Testing of SAPO-17

SAPO-17 was prepared as follows. 48.8 grams of aluminum isopropoxide (Aldrich) were added to 64.6 grams of de-ionized water with vigorous mixing. This mixture was then mixed with 17.58 grams of orthophosphoric acid (85 wt. %) using a blender, and blended vigorously for ten minutes. Then, 1.56 grams of colloidal silica (Ludox AS-30, DuPont) were added followed by 3.24 grams of hydrofluoric acid HF (48 wt. %, Aldrich), and the mixture stirred for ten minutes. Next, 7.74 grams of cyclohexylamine (Aldrich) were added and the mixture stirred for five minutes. The mixture was placed in a plastic container and the container into a water bath at 80° C. in order to remove iso-propanol, a decomposition product from the isopropoxide. The volume of the mixture was reduced by about 40% as the result of this procedure.

The mixture was placed into a Teflon lined reactor and heated in the oven at 200° C. for 24 hours without agitation. The product was separated from its mother-liquor by vacuum filtration. It was washed with 300 mL of a 0.1 N solution of HCl in methanol followed by 2.0 liters of deionized water. The product was dried at room temperature over night. The diffraction pattern of the product matched that of the SAPO-17 erionite available from the literature.

The material was calcined in air according to the following method. The temperature was ramped from room temperature to 630° C. at the rate of 1° C./minute. The sample was kept at 630° C. for six hours and then cooled to room temperature overnight. Micropore volume of the molecular sieves was 0.233 cc/g, and BET surface area 414 m$^2$/g.

The silica-to-alumina ratio for these molecular sieves was approximately 0.1. The molecular sieves were used to prepare a mixed matrix film with polyvinylacetate (PVAc), with the molecular sieve loading at 15 wt. %, after which the film was dried at 75° C. The film was tested for O$_2$, N$_2$ and CO$_2$ permeability at 35° C. and 50 psi, giving an oxygen permeability of 0.54 Barrers, an O$_2$/N$_2$ selectivity of 7.2, and a CO$_2$/N$_2$ selectivity of 47.4.

TABLE 5

(PVAc) SAPO-17 Mixed Matrix Membrane

| Gas Component | Permeability ($10^{-10}$ cm$^3$ (STP) · cm/ cm$^2$ · s · cm Hg) | Selectivity |
|---|---|---|
| O$_2$ | 0.54 B | O$_2$/N$_2$ = 7.2 |
| N$_2$ | 0.075 B | CO$_2$/N$_2$ = 47.2 |
| CO$_2$ | 3.54 B | |

By contrast, the oxygen permeability of a neat PVAc membrane alone was measured at 0.53 Barrers, with an O$_2$/N$_2$ selectivity of 5.91, and the CO$_2$/N$_2$ selectivity was 34.7.

TABLE 6

Neat (PVAc) Mixed Matrix Membrane

| Gas Component | Permeability ($10^{-10}$ cm$^3$ (STP) · cm/ cm$^2$ · s · cm Hg) | Selectivity |
|---|---|---|
| O$_2$ | 0.53 B | O$_2$/N$_2$ = 5.91 |
| N$_2$ | 0.09 B | CO$_2$/N$_2$ = 34.7 |
| CO$_2$ | 3.12 B | |

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A mixed matrix membrane comprising:
   a continuous phase organic polymer and small pore molecular sieves dispersed therein, the molecular sieves having a largest minor crystallographic free diameter of 3.6 Angstroms or less, wherein: the molecular sieves have an IZA structure type of at least one of ERI, DDR, RHO, PAU, LEV, MER, AFX, AFT, and GIS;
   wherein the membrane exhibits a mixed matrix effect.

2. The mixed matrix membrane of claim 1 wherein: the molecular sieves have pores with a largest minor crystallographic free diameter in the range of 3.0–3.6 A.

3. The mixed matrix membrane of claim 1 wherein: the molecular sieves have pores with a largest minor crystallographic free diameter in the range of 3.0–3.4 A.

4. The mixed matrix membrane of claim 1 wherein: the molecular sieves have pores with a largest minor crystallographic free diameter in the range of 3.0–3.2 A.

5. The mixed matrix membrane of claim 1 wherein: the molecular sieves have an IZA structure type of at least one of MER, AFX, AFT, and GIS.

6. The mixed matrix membrane of claim 1 wherein: the molecular sieves have an IZA structure type of at least one of AFT and GIS.

7. The mixed matrix membrane ot claim 1 wherein: the molecular sieves have an IZA structure type of GIS.

8. The mixed matrix membrane of claim 1 wherein: the molecular sieves include at least one of AlPO-17, SAPO-17, CVX-7, ZSM-58, LZ-214, ECR-18, SAPO-35, Zeolite W, SAPO-56, AlPO-52, and SAPO-43.

9. The mixed matrix membrane of claim 1 wherein: the molecular sieves include at least one of Zeolite W, SAPO 56, AlPO-52, and SAPO-43.

10. The mixed matrix membrane of claim 1 wherein: the molecular sieves includes CVX-7; wherein a surface complexing agent is used to reduce the number average crystallite size of the CVX-7 molecular sieves.

11. The mixed matrix membrane of claim 1 wherein: the molecular sieves have an average particle size of less than 3 microns.

12. The mixed matrix membrane of claim 1 wherein: the molecular sieves have an average particle size between 0.2 to 3.0 microns.

13. The mixed matrix membrane of claim 1 wherein: the molecular sieves have an average particle size between 0.2 to 1.5 microns.

14. The mixed matrix membrane of claim 1 wherein: the molecular sieves have an average particle size between 0.2 to 0.7 microns.

15. The mixed matrix membrane of claim 1 wherein: the molecular sieves are generally elongate in morphology and have an aspect ratio of less than 10.

16. The mixed matrix membrane of claim 1 wherein: the molecular sieves are generally elongate in morphology and have an aspect ratio of less than 5.

17. The mixed matrix membrane of claim 1 wherein: the molecular sieves are generally elongate in morphology and have an aspect ratio between 1 and 3.

18. A method of making a mixed matrix membrane comprising:
providing a continuous phase organic polymer;
providing small pore molecular sieves having a largest minor crystallographic free diameter in the range of 3.0–3.6 Angstroms and an IZA structure type of at least one of ERI, DDR, RHO PAU, LEV, MER, AFX, AFT, and GIS;
dispersing the molecular sieves into a solution containing the continuous phase organic polymer; and
allowing the continuous phase organic polymer to solidify about the molecular sieves to produce a mixed matrix membrane;
whereby the mixed matrix membrane exhibits a mixed matrix effect.

19. A process for separating gas components having different molecular sizes from a feed stream including the gas components, the process including:
(a) providing a mixed matrix membrane having a continuous phase organic polymer and small pore molecular sieves dispersed therein, the molecular sieves having a minor crystallographic free diameter in the range of 3.0 to 3.6 Angrstroms and an IZA structure type of at least one of ERI, DDR, RHO, PAU, LEV, MER, AFX, AFT, and GIS, and the membrane including feed and permeate sides; and
(b) directing a feedetream including first and second gas components to the feed side of the membrane and withdrawing a retentate stream depleted in the first gas component from the feed side and withdrawing a permeate stream enriched in the first gas component from the permeate side of the membrane.

20. A mixed matrix membrane comprising:
a continuous phase organic polymer and small pore molecular sieves dispersed therein, the molecular sieves having a largest minor crystallographic free diameter of 3.6 Angstroms or less, and being generally elongate in morphology having an aspect ratio of less than 10;
wherein the membrane exhibits a mixed matrix effect.

21. The mixed matrix membrane of claim 20, wherein the molecular sieves have pores with a largest minor crystallographic free diameter in the range of 3.0–3.6 A.

22. The mixed matrix membrane of claim 20, wherein the molecular sieves have pores with a largest minor crystallographic free diameter in the range of 3.0–3.4 A.

23. The mixed matrix membrane of claim 20, wherein the molecular sieves have pores with a largest minor crystallographic free diameter in the range of 3.0–3.2 A.

24. The mixed matrix membrane of claim 20, wherein the molecular sieves have an IZA structure type of at least one of ERI, DDR, RHO, PAU, LEV, MER, AFX, AFT, and GIS.

25. The mixed matrix membrane of claim 20, wherein the molecular sieves have an IZA structure type of at least one of MER, AFX, AFT, and GIS.

26. The mixed matrix membrane of claim 20, wherein the molecular sieves have an IZA structure type of at least one of AFT and GIS.

27. The mixed matrix membrane of claim 20, wherein the molecular sieves have an IZA structure type of GIS.

28. The mixed matrix membrane of claim 20, wherein the molecular sieves include at least one of AlPO-17, SAPO17, CVX-7, ZSM-58, LZ-214, ECR-18, SAPO-35, Zeolite W, SAPO-56, AlPO-52, and SAPO43.

29. The mixed matrix membrane of claim 20, wherein the molecular sieves include at least one of Zeolite W, SAPO-56, AlPO-52, and SAPO43.

30. The mixed matrix membrane of claim 20, wherein the molecular sieves includes CVX-7; wherein a surface complexing agent is used to reduce the number average crystallite size of the CVX-7 molecular sieves.

31. The mixed matrix membrane of claim 20, wherein the molecular sieves have an average particle size of less than 3 microns.

32. The mixed matrix membrane of claim 20, wherein the molecular sieves have an average particle size between 0.2 to 3.0 microns.

33. The mixed matrix membrane of claim 20, wherein the molecular sieves have an average particle size between 0.2 to 1.5 microns.

34. The mixed matrix membrane of claim 20, wherein the molecular sieves have an average particle size between 0.2 to 0.7 microns.

35. The mixed matrix membrane of claim 20, wherein the molecular sieves are generally elongate in morphology and have an aspect ratio of less than 10.

36. The mixed matrix membrane of claim 20, wherein the molecular sieves are generally elongate in morphology and have an aspect ratio between 1 and 3.

37. A method of making a mixed matrix membrane comprising:
providing a continuous phase organic polymer;
providing small pore molecular sieves having a largest minor crystallographic free diameter in the range of 3.0–3.6 Angstroms and being generally elongate in morphology having an aspect ratio of less than 10;
dispersing the molecular sieves into a solution containing the continuous phase organic polymer; and allowing the continuous phase organic polymer to solidify about the molecular sieves to produce a mixed matrix membrane;

whereby the mixed matrix membrane exhibits a mixed matrix effect.

38. A process for separating gas components having different molecular sizes from a feed stream including the gas components, the process including:

(a) providing a mixed matrix membrane having a continuous phase organic polymer and small pore molecular sieves dispersed therein, the molecular sieves having a minor crystallographic free diameter in the range of 3.0 to 3.6 Angstroms and being generally elongate in morphology having an aspect ratio of less than 10, and the membrane including feed and permeate sides; and (b) directing a feedstream including first and second gas components to the feed side of the membrane and withdrawing a retentate stream depleted in the first gas component from the feed side and withdrawing a permeate stream enriched in the first gas component from the permeate side of the membrane.

* * * * *